(12) United States Patent
Leidig

(10) Patent No.: US 8,998,167 B2
(45) Date of Patent: Apr. 7, 2015

(54) SOLENOID VALVE FOR CONTROLLING FLOW OF HIGH VISCOSITY MEDIUM

(71) Applicant: Buerkert Werke GmbH, Ingelfingen (DE)

(72) Inventor: Albert Leidig, Ilshofen (DE)

(73) Assignee: Buerkert Werke GmbH (DE)

( * ) Notice: Subject to any disclaimer, the term of this patent is extended or adjusted under 35 U.S.C. 154(b) by 0 days.

(21) Appl. No.: 14/178,362

(22) Filed: Feb. 12, 2014

(65) Prior Publication Data

US 2014/0225017 A1 Aug. 14, 2014

(30) Foreign Application Priority Data

Feb. 13, 2013 (DE) ...................... 20 2013 100 643 U

(51) Int. Cl.
*F16K 31/06* (2006.01)
*F16K 15/18* (2006.01)

(52) U.S. Cl.
CPC ........... *F16K 31/0658* (2013.01); *F16K 15/185* (2013.01); *F16K 31/0655* (2013.01)

(58) Field of Classification Search
CPC ... F16K 15/18; F16K 15/185; F16K 31/0655; F16K 31/0658
USPC .............. 251/129.02, 129.15, 129.19, 83–87, 251/333–334
See application file for complete search history.

(56) References Cited

U.S. PATENT DOCUMENTS

| | | | | |
|---|---|---|---|---|
| 2,735,047 A | * | 2/1956 | Garner et al. | 335/245 |
| 2,735,644 A | * | 2/1956 | Bishofberger | 251/77 |
| 3,089,331 A | * | 5/1963 | Sharko et al. | 73/1.58 |
| 3,523,676 A | * | 8/1970 | Barker | 251/129.05 |
| 3,549,119 A | * | 12/1970 | Sellers | 251/84 |
| 3,827,672 A | * | 8/1974 | Stampfli | 251/129.19 |
| 3,829,060 A | | 8/1974 | von Lewis | 251/129 |
| 4,074,700 A | * | 2/1978 | Engle | 137/625.27 |
| 5,161,778 A | | 11/1992 | Motykiewicz | 251/129.15 |
| 5,209,455 A | * | 5/1993 | Uetsuhara et al. | 251/129.19 |
| 5,232,196 A | * | 8/1993 | Hutchings et al. | 251/129.08 |
| 5,265,841 A | * | 11/1993 | Abrahamsen et al. | 251/75 |
| 5,791,630 A | * | 8/1998 | Nakao et al. | 251/129.19 |
| 6,702,252 B2 | * | 3/2004 | Ben-Asher et al. | 251/129.19 |
| 6,722,629 B1 | * | 4/2004 | Nakazawa | 251/129.17 |
| 2004/0021109 A1 | * | 2/2004 | Okuda et al. | 251/86 |
| 2005/0279956 A1 | | 12/2005 | Berger et al. | 251/77 |

FOREIGN PATENT DOCUMENTS

| | | | | |
|---|---|---|---|---|
| CH | 694279 | 10/2004 | | F16K 1/48 |
| DE | 2208183 | 8/1973 | | B60T 8/36 |
| DE | 3723959 | 2/1989 | | F16K 31/06 |
| DE | 19611832 | 10/1997 | | B60T 15/02 |
| DE | 19917756 | 1/2000 | | B60T 8/36 |
| DE | 102004028968 | 1/2006 | | F16K 1/44 |
| DE | 102005037742 | 2/2007 | | F02M 51/00 |
| GB | 2207222 | 1/1989 | | F16K 1/48 |

OTHER PUBLICATIONS

German Search Report issued in corresponding application No. 20 2013 100 643.32, dated Jul. 15, 2013 (3 pgs).

* cited by examiner

*Primary Examiner* — John Bastianelli
(74) *Attorney, Agent, or Firm* — Hayes Soloway P.C.

(57) ABSTRACT

A solenoid valve has a valve seat, a valve element, and a tappet which is shiftably mounted within the solenoid valve and can urge the valve element against the valve seat in which a line perpendicular to a plane defined by the valve seat can be oriented at an angle that is non-zero in relation to the direction of movement of the tappet, the valve seat being oriented obliquely to a center axis defined by a magnetic coil.

16 Claims, 3 Drawing Sheets

SOLENOID VALVE FOR CONTROLLING FLOW OF HIGH VISCOSITY MEDIUM

BACKGROUND OF THE INVENTION

The invention relates to a solenoid valve having a valve seat, a valve element and a tappet which is shiftably mounted within the solenoid valve and can urge the valve element against the valve seat. The invention relates in particular to a solenoid valve that is suitable for controlling the flow of a high-viscosity medium, particularly oil, so that it can be used for an application in oil burners.

Depending on the medium that is switched using the solenoid valve, and also depending on the particular situation of application, there is the problem that the valve element may stick to the valve seat. This may result in the solenoid valve reaching the open state from the closed state only with a delay.

The object of the invention consists in further developing a solenoid valve of the type mentioned at the outset to the effect that it will reliably open in all operating conditions.

SUMMARY OF THE INVENTION

To achieve this object, according to the invention provision is made in a solenoid valve of the type mentioned at the outset that a line perpendicular to a plane defined by the valve seat can be oriented at an angle that is non-zero in relation to the direction of movement of the tappet, the valve seat being oriented obliquely to a center axis defined by a magnetic coil. Expressed in general terms, the invention is based on the fundamental idea that when the solenoid valve is opened, the tappet pulls the valve element back from the valve seat at a slight angle. Should the valve element stick to the valve seat, the oblique removal direction will cause the separation forces to initially concentrate at one side of the valve element so that, expressed with some exaggeration, the valve element is peeled off from the valve seat starting from this side. The oblique orientation of the valve seat allows the desired oblique position to be brought about with little effort, without any design modifications having to be made to the valve drive. Instead, it is sufficient to mill or otherwise produce the valve seat slightly obliquely.

According to a preferred embodiment of the invention, provision is made that the tappet is oriented obliquely to a center axis defined by a magnetic coil. In this way, too, it can be ensured with comparatively little effort that the valve element is lifted off the valve seat at an angle.

Preferably, a core is provided which is associated with the magnetic coil, the tappet being formed as a component that is separate from the core. This allows the magnetic coil and the core associated with it to be fitted in a straight orientation within the solenoid valve.

The tappet may rest against the core in the axial direction, a radial clearance existing between the core and the tappet in the area of the contact point. This clearance allows the desired oblique position of the tappet to be brought about with little effort.

Preferably, the core is provided with a recess in which the tappet is received. This recess, which is larger in size in the radial direction than the corresponding end of the tappet, firstly provides for a certain guidance for the tappet here and, secondly, also allows the desired oblique position.

According to a preferred embodiment of the invention, provision is made that the core is provided with at least one overflow passage connecting the front end of the core facing the tappet with the front end facing away from the tappet. Such an overflow passage allows a volume compensation between the sides of the core facing away from each other, such that any medium present in this area will not impair the switching stroke of the core.

It is preferably provided for that the solenoid valve is a normally open valve.

It is preferably provided for that the tappet is provided with a mount for the valve element. This allows the valve element to be fitted to the tappet with little effort such that it is protected in the mount.

Preferably, provision is made that the valve element is adapted to be shifted within the mount in the axial direction. If the valve element can be shifted relative to the tappet, it is reliably ensured that the valve element rests uniformly on the valve seat even though the valve seat and the tappet are oriented obliquely in relation to each other.

In this connection it is advantageous if a closing spring is provided which urges the valve element toward the valve seat. The closing spring makes sure that the valve element rests evenly on the valve seat, irrespective of the oblique orientation of the tappet in relation to the valve seat. Any tolerances can be automatically compensated for here.

According to one configuration of the invention, provision is made that the contact surface is formed by a retaining ring arranged on the open side of the mount. This retaining ring allows the valve element to be shiftably fitted within the mount with little effort.

Preferably, the mount is provided with at least one compensating channel.

The compensating channel allows the medium present in the mount to be displaced out of the mount when the valve element is moved within the mount during closing of the solenoid valve.

Preferably, an opening spring is provided which urges the tappet away from the valve seat. The opening spring ensures that, in the case of the normally open valve, the tappet reliably remains in the open position, in which the valve element is lifted off from the valve seat.

BRIEF DESCRIPTION OF THE DRAWINGS

The invention will now be described below with reference to an embodiment which is illustrated in the accompanying drawings, in which.

DETAILED DESCRIPTION OF THE INVENTION

Figure 1:
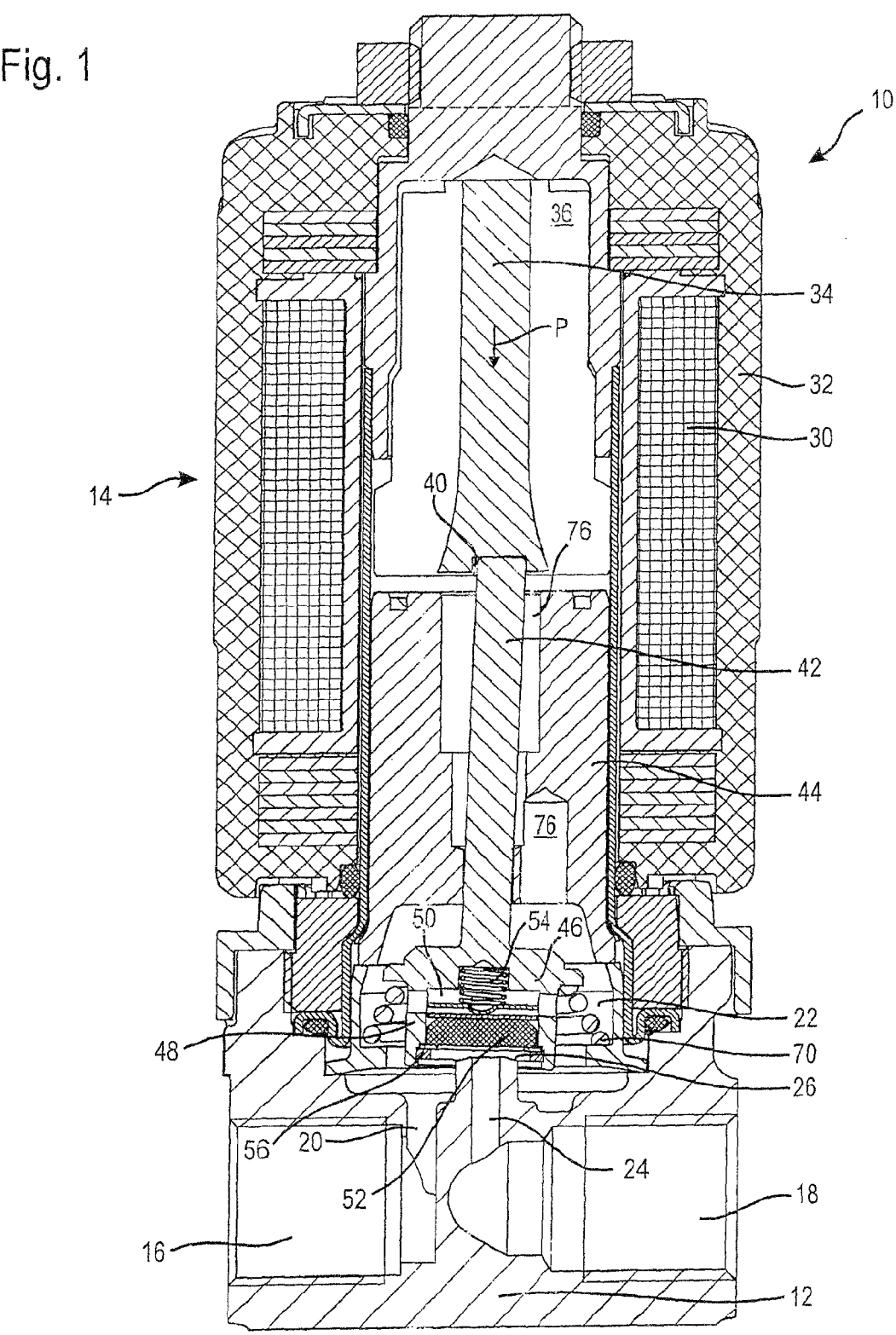
FIG. 1 shows a solenoid valve according to the invention in a sectional view, the solenoid valve being in the open position.

FIG. 1 shows a solenoid valve 10 which includes a valve body 12 and a valve drive 14. The solenoid valve 10 may be used in particular for controlling the flow of a high-viscosity medium, particularly oil. Especially preferably, the solenoid valve 10 is made use of in oil burners.

The valve body 12 has a first valve port 16 and a second valve port 18. The first valve port 16 is connected with a space 22 via a channel 20, the space 22 being associated with the valve drive 14. The second valve port 18 is connected with a valve channel 24 having an end that is formed as a valve seat 26. The valve seat 26 is an annular surface here which slopes down outwards.

The valve drive 14 includes a magnetic coil 30 arranged within a housing 32. Associated with the magnetic coil 30 is a core 34 which, as viewed in the axial direction, is largely arranged within the magnetic coil 30. Only the end of the core 34 facing away from the valve body 12 projects beyond the magnetic coil 30 in the axial direction.

Figure 2:
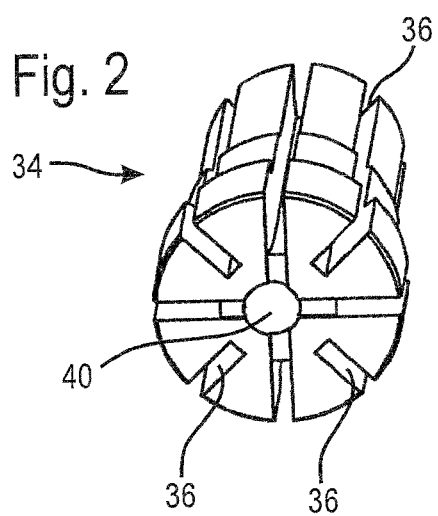
FIG. 2 shows, in a perspective view, the core used in the solenoid valve of FIG. 1.

The core 34 consists of a magnetic material and is moved in the direction of the arrow P when the magnetic coil 30 is excited. As can be seen in particular in FIG. 2, the core 34 is a generally cylindrical component with an outer periphery having altogether several overflow passages 36 provided therein which connect the two front ends of the core 34 facing away from each other. In the embodiment shown, eight overflow passages are used. Depending on the respective requirements, a larger or smaller number of overflow passages 36 may be used, for example four overflow passages.

An eccentrically arranged recess 40 is provided on that front end of the core 34 which faces the valve body 12 in the installed condition. The recess 40 is larger in size than the diameter of the end of the tappet engaging into the recess.

The end of a tappet 42 facing away from the valve body 12 engages into the recess 40, the tappet 42 being shiftably received in the valve drive 14, in particular within a guide 44. At its end facing the valve body 12, the tappet 42 is provided with a valve tappet plate 46 and a skirt 48 attached thereto. Formed within the skirt 48 is a mount 50 in which a valve element 52 is arranged. The valve element 52 is provided for cooperation with the valve seat 26. It may be formed from an elastomer, but in particular from PTFE, PCTFE or PEEK.

The valve element 52 is shiftably arranged in the mount 50. It is urged by a closing spring 54 out of the mount 50 and against a contact surface 56 which is formed by a retaining ring that is inserted in a groove of the skirt 48 of the tappet 42. As an alternative, the contact surface may also be obtained by a flanging of the skirt 48 of the tappet 42 inwards.

On its side facing the valve element 52, the closing spring 54 supports itself in a spring holder 60 which rests against a pressure plate 64 by means of a crowned projection 62, the valve element 52 for its part being supported against the pressure plate 64. Owing to the centric force introduction from the crowned projection 62, the valve element 52 can each time align itself in the mount 50 such that it rests evenly against the valve seat 26 when the tappet 42 is in the corresponding position.

Arranged in the space 22 is an opening spring 70 which urges the tappet 42 away from the valve seat 26 and toward the core 34.

Because of the opening spring 70, the solenoid valve shown is a normally open valve. The opening spring 70 pushes the tappet 42 and therefore the core 34 upward with respect to FIG. 1, that is, away from the valve seat 26. The contact surface 56 here ensures that the valve element 52 does not rest against the valve seat 26 in spite of the application of pressure by the closing spring 54. As a result, a passage between the two valve ports 16, 18 is open.

Figure 3:
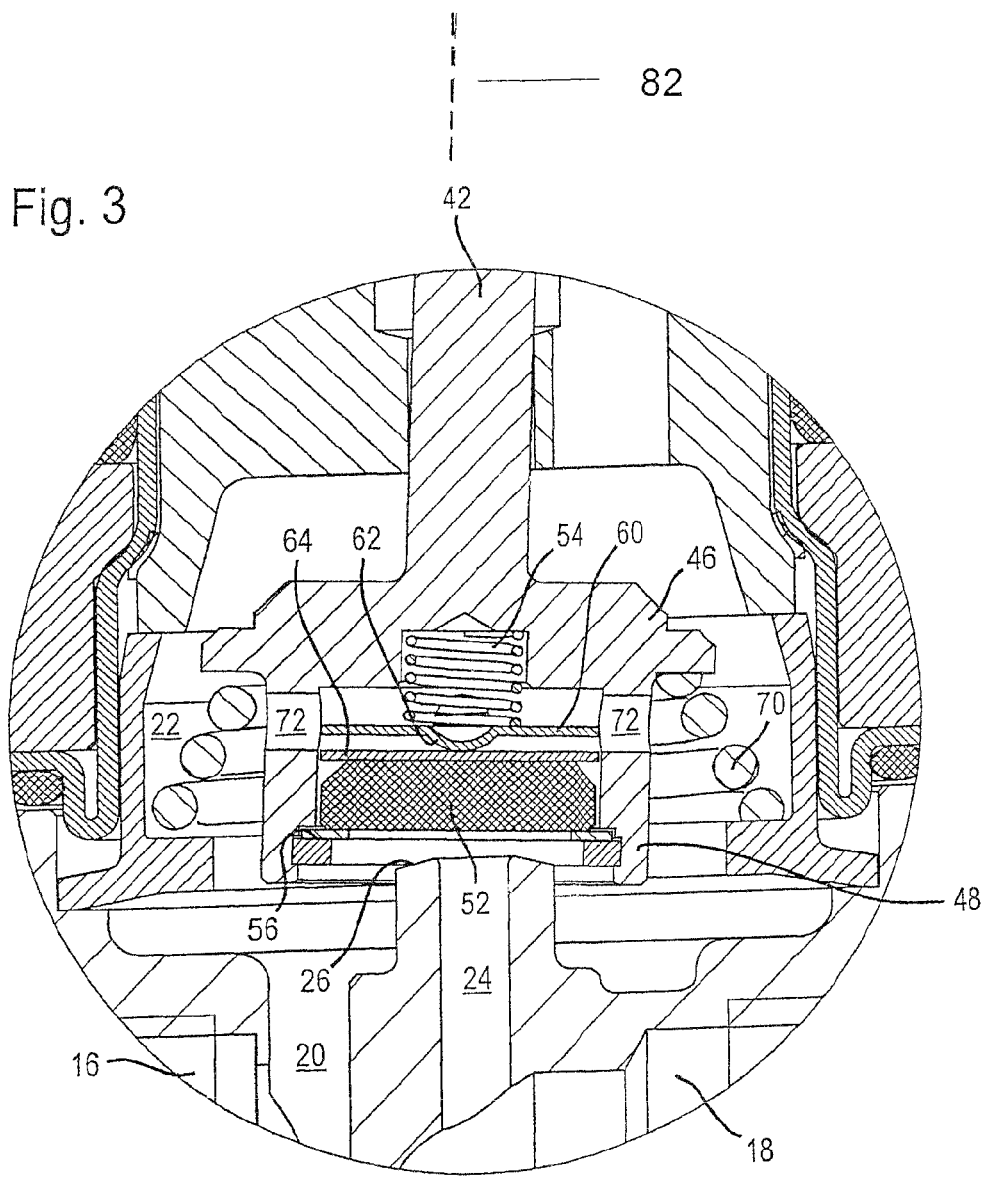
FIG. 3 shows, in a partial view, the valve seat, the valve element and the tappet of the solenoid valve of FIG. 1, the solenoid valve being in the closed position.
Figure 1:
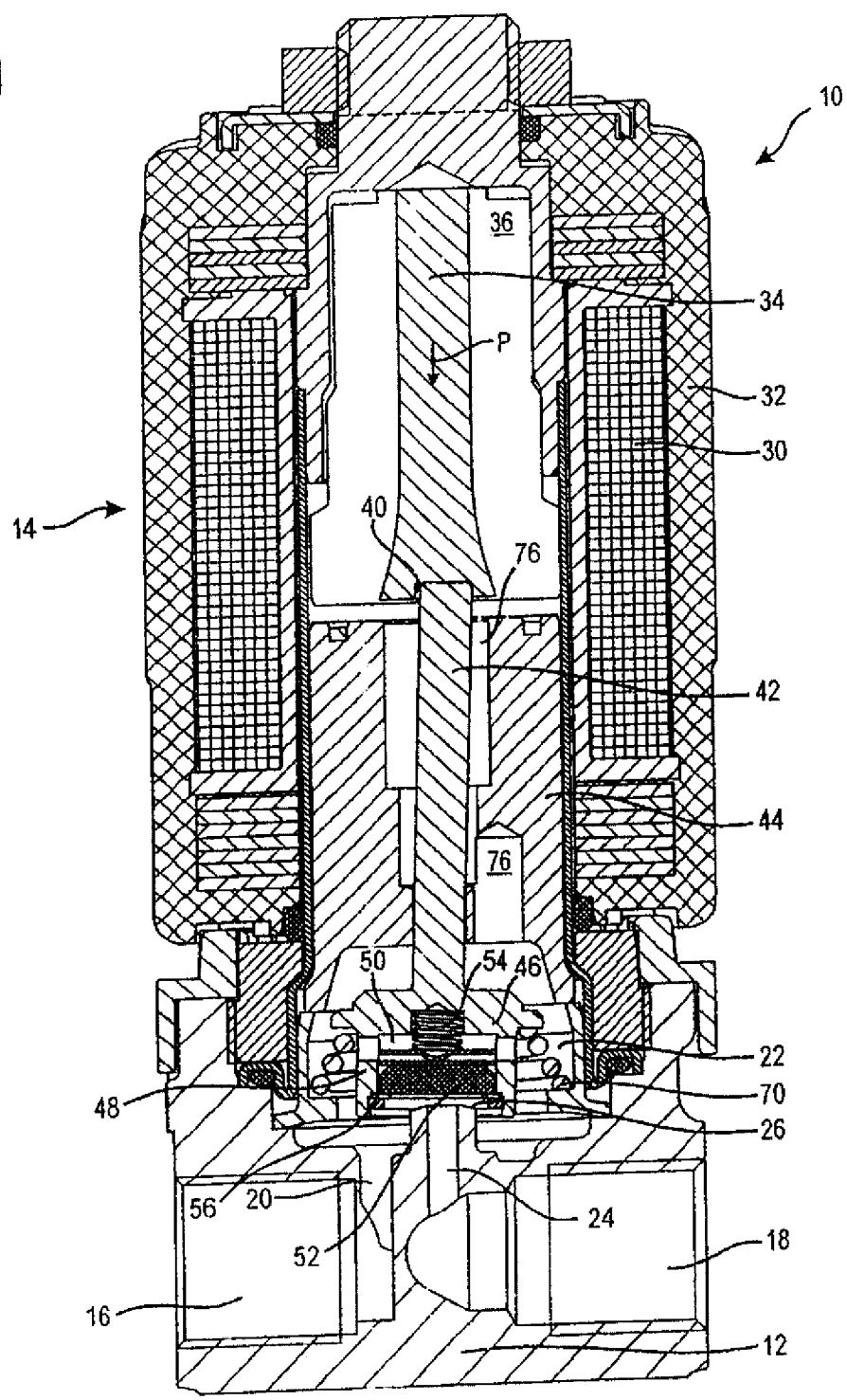

In order to close the valve, the magnetic coil 30 is excited. This causes the core 34 to be moved in the direction of the arrow P of FIG. 1, as a result of which the tappet 42 is also shifted in the same direction. In the process, the tappet 42 is shifted so far toward the valve seat 26 that the valve element 52 rests against the valve seat 26 and is lifted off the contact surface 56 (see FIG. 3). In this state, the closing spring 54 ensures that the valve element 52 is evenly pressed onto the valve seat 26 and effects a sealing there. Compensating channels 72 provided in the skirt 48 make sure that the medium present in the mount 50 can be displaced outward when the valve element 52 is pushed into the mount 50.

To transfer the valve from the closed condition to the open condition, the magnetic coil 30 is switched off. Then the opening spring 70 succeeds in shifting the tappet 42 and also the core 34 contrary to the direction of the arrow P. Owing to the overflow passages 36, the volume flow rates of the medium that are required here between the front ends of the core 34 facing away from each other are possible without any problems. In addition, the guide 44 is also provided with respective passages 76.

Since the recess 40 is arranged slightly eccentrically in the core 34, the tappet 42 is arranged slightly obliquely to the center axis 78 of the valve drive 14. But the center axis of the valve seat 26, more precisely the center axis of the truncated cone defined by the valve seat 26, coincides with the center axis of the valve drive. Therefore, the center axis of the valve seat (or a line 80 perpendicular to a plane that is defined by the uppermost edge of the valve seat) extends at a small, non-zero angle relative to the center axis 80 of the tappet 42. Due to this oblique position of the tappet 42, the valve element 52 is lifted off at a slight angle when it is pulled back from the valve seat 26 when the solenoid valve is opened. Supposing that the tappet 42 is slightly pivoted clockwise with respect to FIGS. 1 and 3, this means that the left side, with respect to the Figures, of the valve element 52 is first lifted off the valve seat 26. Assuming that the valve element 52 sticks to the valve seat 26, the opening force exerted on the valve element 52 by the opening spring 70 by means of the contact surface 56 therefore at first acts on the left side in a concentrated fashion, so that a detachment is obtained there. Subsequently, the rest of the valve element 52 is peeled off from the valve seat 26.

The solenoid valve described can be made use of for switching pressures of up to 30 bars even if the medium that is used is oil (viscosity 0 to 75 centistokes). The valve is suitable for heavy oil having a temperature of up to 160° C., a long service life with at least 500,000 switching cycles being reached. Even after an endurance test, there results a seat leakage of less than 1 cm$^3$/hour.

The invention claimed is:

1. A solenoid valve comprising a valve seat, a valve element, and a tappet which is shiftably mounted within the solenoid valve for urging the valve element against the valve seat wherein a line perpendicular to a plane defined by the valve seat can be oriented at an angle that is non-zero in relation to the direction of movement of the tappet, the valve seat being oriented obliquely to a center axis defined by a magnetic coil, and the tappet is oriented obliquely to a center axis defined by the magnetic coil.

2. The solenoid valve according to claim 1, wherein a core is provided which is associated with the magnetic coil, and that the tappet is formed as a component which is separate from the core.

3. The solenoid valve according to claim 2, wherein the tappet rests against the core in the axial direction, a radial clearance existing between the core and a tappet in the area of the contact point.

4. The solenoid valve according to claim 2, wherein the core is provided with a recess in which the tappet is received.

5. The solenoid valve according to claim 4, wherein the recess is arranged eccentrically with respect to the center axis of the core.

6. The solenoid valve according to claim 1, wherein the core is provided with at least one overflow passage connecting the front end of the core facing the tappet with the front end facing away from the tappet.

7. The solenoid valve according to claim 1, wherein the valve is normally open.

8. The solenoid valve according to claim 1, wherein the tappet is provided with a mount for the valve element.

9. The solenoid valve according to claim 8, wherein the valve element is adapted to be shifted within the mount in the axial direction.

10. The solenoid valve according to claim 8, wherein a closing spring is provided which urges the valve element toward the valve seat.

11. The solenoid valve according to claim 8, wherein the tappet is provided with a contact surface for the valve element.

12. The solenoid valve according to claim 11, wherein the contact surface is formed by a retaining ring arranged on the open side of the mount.

13. The solenoid valve according to claim 8, wherein the mount is provided with at least one compensating channel.

14. The solenoid valve according to claim 1, wherein an opening spring is provided which urges the tappet away from the valve seat.

15. A solenoid valve comprising a valve seat, a valve element, and a tappet which is shiftably mounted within the solenoid valve for urging the valve element against the valve seat wherein a line perpendicular to a plane defined by the valve seat can be oriented at an angle that is non-zero in relation to the direction of movement of the tappet, the valve seat being oriented obliquely to a center axis defined by a magnetic coil, wherein a core is provided which is associated with the magnetic coil, and that the tappet is formed as a component which is separate from the core, and wherein the tappet rests against the core in the axial direction, a radial clearance existing between the core and a tappet in the area of a contact point.

16. A solenoid valve comprising a valve seat, a valve element, and a tappet which is shiftably mounted within the solenoid valve for urging the valve element against the valve seat wherein a line perpendicular to a plane defined by the valve seat can be oriented at an angle that is non-zero in relation to the direction of movement of the tappet, the valve seat being oriented obliquely to a center axis defined by a magnetic coil, wherein a core is provided which is associated with the magnetic coil, and that the tappet is formed as a component which is separate from the core, wherein the core is provided with a recess in which the tappet is received, and wherein the recess is arranged eccentrically with respect to the center axis of the core.

* * * * *

UNITED STATES PATENT AND TRADEMARK OFFICE
CERTIFICATE OF CORRECTION

| | | |
|---|---|---|
| PATENT NO. | : 8,998,167 B2 | Page 1 of 3 |
| APPLICATION NO. | : 14/178362 | |
| DATED | : April 7, 2015 | |
| INVENTOR(S) | : Leidig | |

It is certified that error appears in the above-identified patent and that said Letters Patent is hereby corrected as shown below:

The Title page, showing the illustrative figure, should be deleted and substitute therefor the attached Title page.

Please replace FIG. 1 with FIG. 1 as shown on the attached pages.

Signed and Sealed this
Ninth Day of February, 2016

Michelle K. Lee
*Director of the United States Patent and Trademark Office*

(12) United States Patent
Leidig

(10) Patent No.: US 8,998,167 B2
(45) Date of Patent: Apr. 7, 2015

(54) SOLENOID VALVE FOR CONTROLLING FLOW OF HIGH VISCOSITY MEDIUM

(71) Applicant: Buerkert Werke GmbH, Ingelfingen (DE)

(72) Inventor: Albert Leidig, Ilshofen (DE)

(73) Assignee: Buerkert Werke GmbH (DE)

(*) Notice: Subject to any disclaimer, the term of this patent is extended or adjusted under 35 U.S.C. 154(b) by 0 days.

(21) Appl. No.: 14/178,362

(22) Filed: Feb. 12, 2014

(65) Prior Publication Data
US 2014/0225017 A1    Aug. 14, 2014

(30) Foreign Application Priority Data
Feb. 13, 2013    (DE) .............. 20 2013 100 643 U

(51) Int. Cl.
 F16K 31/06    (2006.01)
 F16K 15/18    (2006.01)

(52) U.S. Cl.
 CPC .......... *F16K 31/0658* (2013.01); *F16K 15/185* (2013.01); *F16K 31/0655* (2013.01)

(58) Field of Classification Search
 CPC ... F16K 15/18; F16K 15/185; F16K 31/0655; F16K 31/0658
 USPC ............ 251/129.02, 129.15, 129.19, 83–87, 251/333–334
 See application file for complete search history.

(56) References Cited

U.S. PATENT DOCUMENTS

| | | | | |
|---|---|---|---|---|
| 2,735,047 | A | * | 2/1956 | Garner et al. .............. 335/245 |
| 2,735,644 | A | * | 2/1956 | Bishofberger ............... 251/77 |
| 3,089,331 | A | * | 5/1963 | Sharko et al. ............... 73/1.58 |
| 3,523,676 | A | * | 8/1970 | Barker .................. 251/129.05 |
| 3,549,119 | A | * | 12/1970 | Sellers ....................... 251/84 |
| 3,827,672 | A | * | 8/1974 | Stampfli ................ 251/129.19 |
| 3,829,060 | A | | 8/1974 | von Lewis .................. 251/129 |
| 4,074,700 | A | * | 2/1978 | Engle ..................... 137/625.27 |
| 5,161,778 | A | * | 11/1992 | Morykiewicz ......... 251/129.15 |
| 5,209,455 | A | * | 5/1993 | Uetsuhara et al. ..... 251/129.19 |
| 5,232,196 | A | * | 8/1993 | Hutchings et al. ..... 251/129.08 |
| 5,265,841 | A | * | 11/1993 | Abrahamsen et al. ....... 251/75 |
| 5,791,630 | A | * | 8/1998 | Nakao et al. ........... 251/129.19 |
| 6,702,252 | B2 | * | 3/2004 | Ben-Asher et al. .... 251/129.19 |
| 6,722,629 | B1 | * | 4/2004 | Nakazawa ............. 251/129.17 |
| 2004/0021109 | A1 | * | 2/2004 | Okuda et al. ................ 251/86 |
| 2005/0279956 | A1 | | 12/2005 | Berger et al. ................ 251/77 |

FOREIGN PATENT DOCUMENTS

| | | | |
|---|---|---|---|
| CH | 694279 | 10/2004 | ............ F16K 1/48 |
| DE | 2208183 | 8/1973 | ............ B60T 8/36 |
| DE | 3723959 | 2/1989 | ............ F16K 31/06 |
| DE | 19611832 | 10/1997 | ............ B60T 15/02 |
| DE | 19917756 | 1/2000 | ............ B60T 8/36 |
| DE | 102004028968 | 1/2006 | ............ F16K 1/44 |
| DE | 102005037742 | 2/2007 | ............ F02M 51/00 |
| GB | 2207222 | 1/1989 | ............ F16K 1/48 |

OTHER PUBLICATIONS

German Search Report issued in corresponding application No. 20 2013 100 643.32, dated Jul. 15, 2013 (3 pgs).

* cited by examiner

*Primary Examiner* — John Bastianelli
(74) *Attorney, Agent, or Firm* — Hayes Soloway P.C.

(57) ABSTRACT

A solenoid valve has a valve seat, a valve element, and a tappet which is shiftably mounted within the solenoid valve and can urge the valve element against the valve seat in which a line perpendicular to a plane defined by the valve seat can be oriented at an angle that is non-zero in relation to the direction of movement of the tappet, the valve seat being oriented obliquely to a center axis defined by a magnetic coil.

16 Claims, 3 Drawing Sheets